UNITED STATES PATENT OFFICE.

ALPHEUS HUGH HIPPLE, OF OMAHA, NEBRASKA.

PROCESS OF TREATING MATERIALS TO RENDER THEM WATERPROOF.

SPECIFICATION forming part of Letters Patent No. 694,859, dated March 4, 1902.

Application filed July 30, 1900. Serial No. 25,324. (No specimens.)

*To all whom it may concern:*

Be it known that I, ALPHEUS HUGH HIPPLE, of Omaha, in the county of Douglas and State of Nebraska, have invented a new and useful Improvement in the Manufacture of Waterproof Asbestos, of which the following is a specification.

In rendering asbestos waterproof I incorporate with it a sufficient quantity of oil to render it impermeable to water and then fix this oil by vulcanization, for which purpose I add sulfur to the oil and incorporate it with the oil and asbestos, as hereinafter described. The material is compressed by suitable means.

I incorporate about sixty parts, by weight, of linseed-oil and twelve parts, by weight, of flowers of sulfur with one hundred parts, by weight, of asbestos and vulcanize the mass thus obtained at a temperature of about 300° Fahrenheit for a period of time—say two hours.

The proportions of the materials and the length of time they are to be vulcanized may be varied within certain limits.

Any form of asbestos which is capable of absorbing or of having oil and sulfur incorporated with it may be used.

If asbestos fiber is used, for instance, it may be mixed into a mass with the other ingredients and be pressed or molded into any desired form and then be vulcanized under pressure.

Asbestos millboard or sheets may have the other materials incorporated with it by passing it through rollers and be vulcanized in the form of compressed sheets.

Other forms of asbestos may be treated in a similar manner, an ordinary steam-vulcanizing apparatus, as is used in the art of vulcanizing rubber, being used.

Having thus described my said invention, what I claim as new, and desire to secure by United States Letters Patent, is—

As an improved article of manufacture, compressed waterproof asbestos, having oil incorporated in its fibers and vulcanized therein, and compressed, as described.

Signed in presence of two witnesses.

ALPHEUS HUGH HIPPLE.

Witnesses:
GEORGE W. SUES,
ETHEL SMITH.